US010570347B2

(12) United States Patent
Moghadam et al.

(10) Patent No.: US 10,570,347 B2
(45) Date of Patent: Feb. 25, 2020

(54) NANOCRYSTALLINE CELLULOSE AND POLYMER-GRAFTED NANOCRYSTALLINE CELLULOSE AS RHEOLOGY MODIFYING AGENTS FOR MAGNESIUM OXIDE AND LIME SLURRIES

(71) Applicant: ECOLAB USA INC., St. Paul, MN (US)

(72) Inventors: Shayan Moghadam, Naperville, IL (US); Rangarani Karnati, Naperville, IL (US); Heinrich E. Bode, Aurora, IL (US); Jasbir S. Gill, Naperville, IL (US)

(73) Assignee: ECOLAB USA INC., St. Paul, MN (US)

( * ) Notice: Subject to any disclaimer, the term of this patent is extended or adjusted under 35 U.S.C. 154(b) by 221 days.

(21) Appl. No.: 15/293,688

(22) Filed: Oct. 14, 2016

(65) Prior Publication Data

US 2017/0107434 A1    Apr. 20, 2017

Related U.S. Application Data

(60) Provisional application No. 62/242,037, filed on Oct. 15, 2015.

(51) Int. Cl.
*C10G 75/04* (2006.01)
*C08F 251/02* (2006.01)
*C09K 8/588* (2006.01)

(52) U.S. Cl.
CPC ............ *C10G 75/04* (2013.01); *C08F 251/02* (2013.01); *C09K 8/588* (2013.01)

(58) Field of Classification Search
None
See application file for complete search history.

(56) References Cited

U.S. PATENT DOCUMENTS 2,178,139 A    10/1939    Epstein et al.
2,202,601 A     5/1940    Ried
2,935,473 A *   5/1960    King .................... C09K 8/203
                                              205/688

(Continued)

FOREIGN PATENT DOCUMENTS

CN    1086233 A    5/1994
CN    1087603 A    6/1994

(Continued)

OTHER PUBLICATIONS

Extended European Search Report from EP App. 14834220.7, dated Mar. 17, 2017, 7 pages.

(Continued)

*Primary Examiner* — John J Figueroa
(74) *Attorney, Agent, or Firm* — Eric D. Babych; Barnes & Thornburg LLP

(57) ABSTRACT

Rheology modifying agents and methods of modifying the rheology of a slurry are disclosed. Methods for the prevention of fouling and methods for monitoring the rheology of a slurry are also provided. The slurry can be a lime slurry or a magnesium oxide slurry, for example. The rheology modifying agent can be polymer-grafted nanocrystalline cellulose. The rheology modifying agent can optionally include other components, such as a chelating agent.

11 Claims, 4 Drawing Sheets

(56) References Cited

U.S. PATENT DOCUMENTS

| | | | |
|---|---|---|---|
| 3,171,810 A * | 3/1965 | King | C09K 8/203 |
| | | | 507/109 |
| 3,278,425 A * | 10/1966 | King | C09K 8/203 |
| | | | 507/109 |
| 3,793,299 A | 2/1974 | Zimmerer | |
| 4,230,610 A | 10/1980 | Falcione et al. | |
| 4,374,702 A | 2/1983 | Turbak et al. | |
| 4,385,961 A | 5/1983 | Svending et al. | |
| 4,388,150 A | 6/1983 | Sunden et al. | |
| 4,711,727 A | 12/1987 | Matthews et al. | |
| 4,743,396 A | 5/1988 | Fong et al. | |
| 4,753,710 A | 6/1988 | Langley et al. | |
| 4,783,314 A | 11/1988 | Hoots et al. | |
| 4,889,653 A | 12/1989 | Ahmed et al. | |
| 4,913,775 A | 4/1990 | Langley et al. | |
| 4,966,652 A | 10/1990 | Wasser | |
| 4,992,380 A | 2/1991 | Moriarty et al. | |
| 5,098,520 A | 3/1992 | Begala | |
| 5,167,776 A | 12/1992 | Bhaskar et al. | |
| 5,171,450 A | 12/1992 | Hoots | |
| 5,182,062 A | 1/1993 | Lee et al. | |
| 5,254,221 A | 10/1993 | Lowry et al. | |
| 5,264,009 A | 11/1993 | Khan | |
| 5,274,055 A | 12/1993 | Honig et al. | |
| 5,346,589 A | 9/1994 | Braunstein et al. | |
| 5,840,158 A | 11/1998 | Choo et al. | |
| 5,866,517 A * | 2/1999 | Carpenter | C09K 8/424 |
| | | | 166/291 |
| 5,877,247 A | 3/1999 | Mahar | |
| 6,071,379 A | 6/2000 | Wong Shing et al. | |
| 6,361,652 B2 | 3/2002 | Keiser et al. | |
| 6,361,653 B2 | 3/2002 | Keiser et al. | |
| 6,372,805 B1 | 4/2002 | Keiser et al. | |
| 6,379,753 B1 | 4/2002 | Soane et al. | |
| 6,486,216 B1 | 11/2002 | Keiser et al. | |
| 6,592,718 B1 | 7/2003 | Wong Shing et al. | |
| 6,605,674 B1 | 8/2003 | Whipple et al. | |
| 7,125,469 B2 | 10/2006 | Barcus et al. | |
| 7,473,334 B2 | 1/2009 | Wong Shing et al. | |
| 7,497,924 B2 | 3/2009 | Nguyen et al. | |
| 7,615,135 B2 | 11/2009 | Harrington et al. | |
| 7,641,776 B2 | 1/2010 | Nagar et al. | |
| 7,718,085 B1 | 5/2010 | Scheurman, III | |
| 7,829,738 B1 | 11/2010 | Brammer, Jr. et al. | |
| 7,955,504 B1 | 6/2011 | Jovanovic et al. | |
| 7,995,504 B2 | 8/2011 | Ransom et al. | |
| 8,012,758 B2 | 9/2011 | Enzien et al. | |
| 8,021,518 B2 | 9/2011 | Furman et al. | |
| 8,066,847 B2 | 11/2011 | Grigoriev et al. | |
| 8,067,629 B2 | 11/2011 | Tong | |
| 8,071,667 B2 | 12/2011 | Furman, Jr. et al. | |
| 8,082,649 B2 | 12/2011 | Rider | |
| 8,088,213 B2 | 1/2012 | Cheng et al. | |
| 8,092,618 B2 | 1/2012 | Sharpe et al. | |
| 8,092,649 B2 | 1/2012 | Shevchenko et al. | |
| 8,097,687 B2 | 1/2012 | Kurian et al. | |
| 8,101,045 B2 | 1/2012 | Furman et al. | |
| 8,123,042 B2 | 2/2012 | Tran | |
| 8,172,983 B2 | 5/2012 | Cheng et al. | |
| 8,242,287 B2 | 8/2012 | Schertzer et al. | |
| 8,246,780 B2 | 8/2012 | Duggirala et al. | |
| 8,247,593 B2 | 8/2012 | Morrison et al. | |
| 8,247,597 B2 | 8/2012 | Fair et al. | |
| 8,258,208 B2 | 9/2012 | Kurian et al. | |
| 8,262,852 B2 | 9/2012 | Duggirala et al. | |
| 8,262,858 B2 | 9/2012 | Duggirala et al. | |
| 8,288,835 B2 | 10/2012 | Quevy et al. | |
| 8,298,439 B2 | 10/2012 | Blubaugh et al. | |
| 8,298,508 B2 | 10/2012 | Wang et al. | |
| 8,302,778 B2 | 11/2012 | Tran | |
| 8,366,877 B2 | 2/2013 | Duggirala et al. | |
| 8,382,947 B2 | 2/2013 | Skaggs et al. | |
| 8,382,950 B2 | 2/2013 | Cheng | |
| 8,398,901 B2 | 3/2013 | Beck et al. | |
| 8,414,739 B2 | 4/2013 | Kimura et al. | |
| 8,440,052 B2 | 5/2013 | Duggirala et al. | |
| 8,444,812 B2 | 5/2013 | Grigoriev et al. | |
| 8,465,623 B2 | 6/2013 | Zhao et al. | |
| 8,945,345 B2 | 2/2015 | Laine et al. | |
| 9,034,145 B2 | 5/2015 | Castro et al. | |
| 2005/0025659 A1 | 2/2005 | Godfrey et al. | |
| 2006/0144535 A1 | 7/2006 | Nguyen et al. | |
| 2008/0206126 A1 | 8/2008 | Benson et al. | |
| 2008/0265222 A1 | 10/2008 | Ozersky et al. | |
| 2009/0173692 A1 | 7/2009 | Laraway et al. | |
| 2010/0313619 A1 | 12/2010 | Biotteau et al. | |
| 2011/0182990 A1 | 7/2011 | Su et al. | |
| 2011/0196094 A1 | 8/2011 | Hamad et al. | |
| 2011/0201755 A1 | 8/2011 | Hamad et al. | |
| 2011/0250341 A1 | 10/2011 | Keiser et al. | |
| 2011/0277947 A1 | 11/2011 | Hua et al. | |
| 2011/0293932 A1 | 12/2011 | Jiang et al. | |
| 2012/0205065 A1 | 8/2012 | Esser | |
| 2013/0000855 A1 | 1/2013 | Nuopponen et al. | |
| 2013/0139856 A1 | 6/2013 | Vinson et al. | |
| 2013/0146099 A1 | 6/2013 | Monsrud et al. | |
| 2013/0146102 A1 | 6/2013 | Monsrud et al. | |
| 2013/0146425 A1 | 6/2013 | Tokhtuev | |
| 2013/0196883 A1* | 8/2013 | Rincon-Torres | C09K 8/70 |
| | | | 507/112 |
| 2013/0274149 A1* | 10/2013 | Lafitte | C09K 8/905 |
| | | | 507/112 |
| 2014/0048267 A1* | 2/2014 | Pisklak | C04B 40/065 |
| | | | 166/292 |
| 2014/0083416 A1 | 3/2014 | Nuopponen et al. | |
| 2015/0041091 A1 | 2/2015 | Castro et al. | |
| 2015/0072902 A1 | 3/2015 | Lafitte et al. | |
| 2017/0226407 A1* | 8/2017 | Homma | C09K 8/10 |
| 2017/0253786 A1* | 9/2017 | Hall | C09K 8/10 |

FOREIGN PATENT DOCUMENTS

| | | |
|---|---|---|
| CN | 102180979 A | 9/2011 |
| EP | 0594332 A1 | 4/1994 |
| GB | 2157584 A | 10/1985 |
| JP | H08151504 A | 6/1996 |
| WO | WO 02/092701 A1 | 11/2002 |
| WO | WO 2006/048280 A1 | 5/2006 |
| WO | WO 2008/008576 A2 | 1/2008 |
| WO | WO 2008/033283 A1 | 3/2008 |
| WO | WO 2010/124378 A1 | 11/2010 |
| WO | WO 2010/125247 A2 | 11/2010 |
| WO | WO 2010/134868 A1 | 11/2010 |
| WO | WO 2012/034997 A1 | 3/2012 |
| WO | WO 2013/154926 A1 | 10/2013 |

OTHER PUBLICATIONS

Barner-Kowollik, Christopher, "Handbook of RAFT Polymerization." Wiley VCH (2008), Chapters 3, 6, 7, 8, 9, 11, and 12.

Lovell, Peter A. and M.S. El-Aasser, Editors. "Emulsion Polymerization and Emulsion Polymers." John Wiley and Sons (1997), Chapters 1, 11, 21, and 22.

Matyjaszewski, Krzysztof, Editor. "Controlled/Living Radical Polymerization: Progress in ATRP, NMP, and RAFT." ACS Symposium Series 768 (2000), Chapter 10.

Matyjaszewski, Krzysztof and T.P.Davis, Editors. "Handbook of Radical Polymerization." John Wiley and Sons (2002), Chapters 3, 10, 11, 12, and 15.

Matyjaszewski, Krzysztof, B.S. Sumerlin, and N.V. Tsarevsky, Editors. "Progress in Controlled Radical Polymerization: Mechanisms and Techniques." ACS Symposium Series 1100 (2009), Chapters 7, 9, 13, 14, 16, 17, 19, and 21.

Odian, George. "Principles of Polymerization, Fourth Edition." John Wiley and Sons (2004), Chapters 1, 3, and 6.

Rowe, R. C. et al. "Handbook of Pharmaceutical Excipients, First Edition." Chemical Industry Press, 2015, 4 pages, with English excerpt.

Smook, Gary A. "Handbook for Pulp & Paper Technologists, Second Edition." Vancouver, BC: Angus Wilde Publications Inc. (1992), Fifth Printing, 2001, pp. 224-225.

(56) References Cited

OTHER PUBLICATIONS

Smook, Gary A. "Handbook for Pulp & Paper Technologists, Third Edition." Vancouver, BC: Angus Wilde Publications Inc. (2002), Chapters 15, 16, and 18.
Zhu, Lu et al. "Water Treatment Technology, Second Edition." East China University of Science and Technology Press, Aug. 2016, 18 pages, with English excerpt.
International Search Report for PCT/2014/035099, dated Aug. 26, 2014, 3 pages.
International Search Report for PCT/US2014/049614, dated Nov. 18, 2014, 3 pages.
International Search Report for PCT/2016/057001, dated Jan. 23, 2017, 4 pages.
Peel, John D. "Paper Science and Paper Manufacture." Vancouver, BC: Angus Wilde Publications Inc., 1999, p. 90.
Smook, Gary A. "Handbook for Pulp & Paper Technologists, Second Edition." Vancouver, BC: Angus Wilde Publications Inc., 1992, p. 283.

* cited by examiner

NANOCRYSTALLINE CELLULOSE AND POLYMER-GRAFTED NANOCRYSTALLINE CELLULOSE AS RHEOLOGY MODIFYING AGENTS FOR MAGNESIUM OXIDE AND LIME SLURRIES

BACKGROUND OF THE INVENTION

1. Field of the Invention

The present disclosure generally relates to rheology modifying agents useful for modifying the rheology of slurries. More particularly, the present disclosure relates to rheology modifying agents useful for modifying the rheology of lime slurries and magnesium oxide slurries.

2. Description of the Related Art

Slurries of lime and magnesium oxide are commonly added to hot lime and warm lime softeners to treat water hardness (i.e., remove hard water ions) and to assist in silica removal. If these ions are not removed from the water, the subsequent equipment coming into contact with the water will obtain hard water deposits, and fouling of the equipment will occur. Hard water fouling can occur in, for example, heat exchangers, evaporators, and boilers. Heat exchangers, evaporators, and boilers can be used to produce hot water or steam that can be used in various processes, such as hydrocarbon production and power generation. Further, lime and magnesium oxide slurries can also be added to scrubbers to assist with the scrubbing of acid gasses, such as $SO_2$, $H_2S$, and $CO_2$. Magnesium oxide slurries can be used for adjusting pH during waste water treatment.

Feed lines are used to transport the slurries to the various pieces of equipment used in the processes. Without proper treatments for the lime and magnesium oxide slurries, the lime and magnesium can form deposits in the feed lines, thereby reducing the slurry feed flow, and eventually plugging or clogging the feed line. The hardened deposits in the feed lines are typically removed or dissolved by cleaning the feed lines with acids, such as HCl, which is not safe or easy to handle. Moreover, such an acid treatment requires special procedures for waste disposal.

Prior art methods used to clean feed lines are thus dangerous, costly, and require extended periods of system down time. When a slurry feed line becomes clogged, the entire operation needs to be shut down, the feed lines need to be taken off-line, and subsequently cleaned with the acid. In certain processes, these steps must be repeated, sometimes as frequently as once a week, thereby greatly increasing the total time needed to achieve the intended goal of the overall process, such as hydrocarbon production.

BRIEF SUMMARY OF THE INVENTION

Rheology modifying agents and methods of modifying the rheology of slurries are disclosed herein. In one aspect, a method of modifying the rheology of a slurry comprises providing a slurry and adding a rheology modifying agent to the slurry, wherein the rheology modifying agent comprises polymer-grafted nanocrystalline cellulose (NCC).

In another aspect, the disclosure provides a method of preventing fouling during a hydrocarbon production process. The method comprises providing a slurry and adding a rheology modifying agent to the slurry to form a mixture. The rheology modifying agent comprises polymer-grafted NCC. The method also comprises transporting the mixture through a feed line to a piece of equipment in the hydrocarbon production process and preventing fouling in the feed line.

In other aspects, the disclosure provides a method of monitoring the rheology of a slurry. The method comprises drawing the slurry from a tank and pumping the slurry through a transfer pipe. A pressure sensor is disposed at an inlet of the transfer pipe and the pressure sensor monitors pressure as the slurry is being pumped through the transfer pipe.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

DETAILED DESCRIPTION OF THE INVENTION

Figure 1:
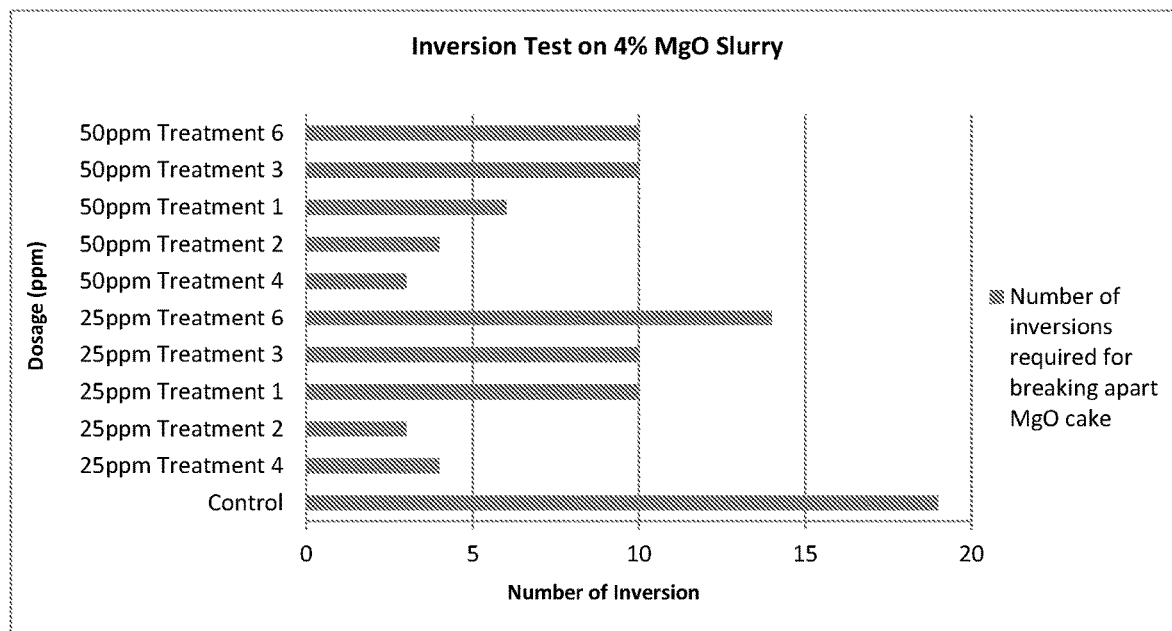
FIG. 1 depicts data obtained from an inversion test.

The present disclosure relates compositions and methods useful for modifying the rheology of slurries. In certain aspects, the slurries are lime slurries. "Lime" can interchangeably be referred to as calcium oxide or CaO. In other aspects, the slurries are magnesium oxide slurries. In addition to magnesium oxide slurries, the presently disclosed rheology modifying agents can also effectively modify the rheology of magnesium hydroxide slurries.

With respect to lime slurries, it is well-known that these slurries can become highly viscous or, in certain situations, they can essentially solidify. Moreover, they can form deposits on the feed lines used for their transportation and they can also completely plug the feed lines, thereby requiring the overall process to be shut down and the feed lines to be cleaned manually or with an acid treatment. In accordance with the present disclosure, various rheology modifying agents are disclosed that can beneficially modify the rheology of these lime slurries, thereby inhibiting or minimizing deposit formation and feed line clogging.

In one aspect, a rheology modifying agent is added to the lime slurry to modify its rheology. In some aspects, the rheology modifying agent can comprise polymer-grafted NCC. In further aspects, the rheology modifying agent can comprise a combination of NCC and polymer-grafted NCC. In accordance with the present disclosure, the terms "polymer" or "polymers" (as in "polymer"-grafted) are intended to include homopolymers, copolymers, terpolymers, etc.

The amount of the rheology modifying agent to be added to the lime slurry depends at least upon the amount of lime in the slurry. For example, a certain dosage of the rheology modifying agent may be added to a 10% lime slurry and a different dosage could be added to a 30% lime slurry. In general, the amount of the rheology modifying agent added to the lime slurry is about 0.1 ppm to about 1,000 ppm, based on active polymer. In other aspects, the amount can be from about 1 ppm to about 100 ppm, based on active polymer. In further aspects, the amount can be from about 2 ppm to about 50 ppm, based on active polymer.

In certain aspects, the polymer grafted onto the NCC comprises acrylamide, acrylic acid, or a combination of acrylamide and acrylic acid. In some embodiments, the polymer of the rheology modifying agent may comprise about 100 mol % acrylic acid. In other embodiments, the polymer of the rheology modifying agent may comprise about 30 mol % acrylic acid and 70 mol % acrylamide. A copolymer of acrylic acid and acrylamide can include any monomer ratio, such as from about 1% to about 100% acrylic acid monomers and about 0% to about 99% acrylamide monomers. For example, a high molecular weight copolymer could include about 90% acrylic acid and about 10% acrylamide.

The grafted polymer chain can have molecular weights of less than about 1,000 Da in certain aspects, in excess of about 200,000 Da in some aspects, in excess of about 1,000,000 Da in other aspects, in excess of about 5,000,000 Da in additional aspects, in excess of about 10,000,000 Da in further aspects, and in excess of about 15,000,000 Da in other aspects.

Figure 4:
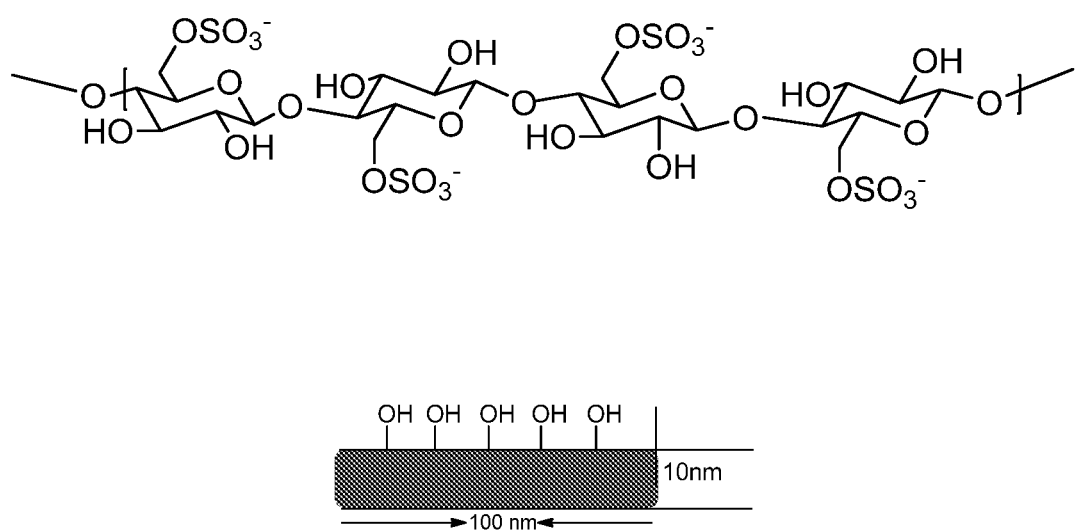
FIG. 4 depicts an embodiment of a polysaccharide backbone.

Cellulose, a renewable, biodegradable, non-toxic polysaccharide is also the most abundant natural biopolymer. Its polysaccharide backbone is made up of repeating β-D-glucopyranose units which contain three free hydroxyl groups per monomer unit (anhydroglucose unit), affording a high degree of functionality. Cellulose on controlled sulfuric acid hydrolysis yields surface esterified nanocrystals with negatively charged sulfate groups providing electrostatic stabilization in aqueous solutions. In addition, nanocrystalline cellulose exhibits consistent and predictable nano-scale dimensions (with a length of about 100 nm, a width of about 10 nm, and a height of about 10 nm), a high specific strength and modulus, and high surface area (see FIG. 4).

NCC can be chemically modified via derivatization of hydroxyl groups grafting through condensation or grafting of vinyl monomers via radical polymerization to meet desired end user requirements. Grafted polysaccharides are of great interest due to their potential use as viscosity modifiers in enhanced oil recovery or as flocculants for wastewater treatment and filler strength applications.

Polyacrylamide, polyacrylic acid, and 2-[(methacryloyloxy)ethyl]trimethylammonium chloride are efficient flocculants for water treatment and various other applications. However, vinyl polymers show limited biodegradability and poor shear-stability whereas NCC is shear-stable but less efficient as a flocculant. The inventors unexpectedly discovered that grafting non-ionic, anionic, and/or cationic vinyl monomers on the NCC backbone yields better performing polyelectrolyte rheology modifying agents.

Polymer-grafted NCC generally includes NCC (backbone polymer) with one or more grafted branches of various monomers. Graft copolymerization offers an attractive and versatile means of imparting a variety of functional groups to the backbone polymer. It permits one to combine the best properties of two or more polymers in one physical unit.

Commonly used methods of grafting cellulose include one or more of "grafting to," "grafting from," and "grafting through" the cellulose. In the "grafting to" approach, the pre-formed polymer end group is coupled with a functional group on the cellulose backbone. In the "grafting from" approach, growth of the polymer chain occurs from initiation sites on the cellulose backbone. nth the "grafting through" approach, a vinyl macro-monomer of cellulose is copolymerized with a low molecular weight co-monomer. Any of these methods may be used in accordance with the present disclosure.

Illustrative, non-limiting examples of water soluble vinyl monomers that can be grafted onto the NCC surface are shown in Table 1. The presently disclosed polymer-grafted NCC can include any monomer listed in Table 1 or any combination of monomers listed in Table 1. Although various monomers are listed in Table 1, the polymer-grafted NCC may include other monomers that are not listed in Table 1.

TABLE 1

| Monomer | Structure |
|---|---|
| vinyl acetate | |
| acrylic acid | |
| sodium acrylate | |
| ammonium acrylate | |
| methyl acrylate | |
| acrylamide | |
| acrylonitrile | |
| N,N-dimethyl acrylamide | |
| 2-acrylamido-2-methylpropane-1-sulfonic acid | |
| sodium 2-acrylamido-2-methylpropane-1-sulfonate | |

TABLE 1-continued

| Monomer | Structure |
|---|---|
| 3-acrylamidopropyl-trimethyl-ammonium chloride | |
| diallyldimethylammonium chloride | |
| 2-(dimethylamino)ethyl acrylate | |
| 2-(acryloyloxy)-N,N,N-trimethylethanaminium chloride | |
| N,N-dimethylaminoethyl acrylate benzyl chloride quaternary salt | |
| 2-(dimethylamino)ethyl methacrylate | |
| 2-(methacryloyloxy)-N,N,N-trimethylethanaminium chloride | |
| 3-(dimethylamino)propyl methacrylamide | |
| methacrylic acid | |
| methacrylic anhydride | |
| methyl methacrylate | |

TABLE 1-continued

| Monomer | Structure |
|---|---|
| methacryloyloxy ethyl trimethyl ammonium chloride | |
| 3-methacrylamidopropyl-trimethyl-ammonium chloride | |
| hexadecyl methacrylate | |
| octadecyl methacrylate | |
| docosyl acrylate | |
| N-vinyl pyrrolidone | |
| 2-vinyl pyridine | |
| 4-vinyl pyridine | |
| epichlorohydrin | |
| N-vinyl formamide | |
| N-vinyl acetamide | |
| 2-hydroxyethyl acrylate | |
| glycidyl methacrylate | |

TABLE 1-continued

| Monomer | Structure |
| --- | --- |
| 3-(allyloxy)-2-hydroxypropane-1-sulfonate | ![structure] |
| 2-(allyloxy)ethanol | ![structure] |

In some embodiments, the NCC surface may comprise one of these monomers, two of these monomers, or three or more of these monomers. The NCC surface may comprise any combination of these monomers. In certain embodiments, one or more of these monomers may be grafted onto the NCC surface using the "grafting from" approach, where the polymer chains are formed by in situ surface-initiated polymerization from immobilized initiators on the surface, as shown below:

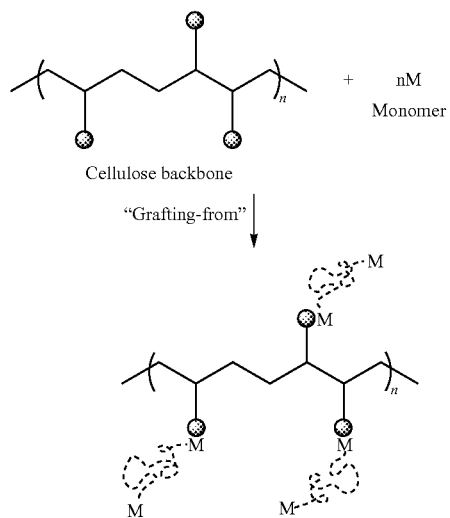

The NCC modified polyelectrolytes can be made to include various non-ionic, anionic, and cationic monomeric compositions using, for example, ceric ammonium nitrate (CAN) initiated free radical polymerization.

Furthermore, in certain aspects, a chelating agent/chelant may be added to the slurry before, with, or after the rheology modifying agent. Chelating agents are commonly known in the art and any chelating agent can be selected by one of skill in the art and used in connection with the present disclosure. In certain aspects, the chelating agent is selected from ethylenediaminetetraacetic acid (EDTA), tetrasodium EDTA, citric acid, ligno sulfonates, dimercaprol (2,3-dimercapto-1-propanol), prophine, and any combination thereof. In one specific aspect, the chelating agent is EDTA.

The amount of chelating agent added to the slurry can be selected by one of ordinary skill in the art. In some embodiments, the amount of chelating agent is from about 1 ppm to about 50 ppm, from about 1 ppm to about 25 ppm, or from about 5 ppm to about 10 ppm. In some embodiments, the amount of chelating agent is about 25 ppm, about 50 ppm, about 75 ppm, or an amount between about 25 ppm and about 50 ppm. In other aspects, the amount may be from about 10 ppm to about 100 ppm or from about 5 ppm to about 100 ppm.

The presently disclosed rheology modifying agent and optional chelating agent can be used in any application where the rheology of a lime or magnesium oxide slurry may need to be modified. One example is an industrial plant having a lime softening system. There are many such industries with lime softening systems and the agents can be used in any of these industries. Exemplary, non-limiting applications of the presently disclosed agents include enhanced oil recovery, waste water lime slurry stabilization, softeners in the textile industry, ware washing/dish washing, pulp and paper, water for food preparation, clean water in healthcare facilities, laboratories and clinics, hydrocarbon production processes, power generation processes, scrubbers used for scrubbing acid gasses, such as $SO_2$, $H_2S$, and $CO_2$, and any other application requiring softening of system chemicals.

For example, the agents would be useful in the hydrocarbon production industry. When extracting bitumen using a Steam Assisted Gravity Drainage (SAGD) technique, once the bitumen has been almost entirely removed from the produced water, the produced water is treated for silica and hardness removal through a process called lime softening.

Magnesium oxide and lime play a crucial role in produced water clarification. They may be added to a warm lime softener (WLS) in the form of a slurry. Magnesium oxide and lime may be pre-mixed with water in different silos before entering the WLS tank. The feed rate of these slurries is calculated based on the percentage of solids in each slurry and the quality of produced water entering the WLS. These slurries are added to the WLS via transfer pipes. An issue faced with the WLS is inadequate addition of lime and magnesium oxide due to solids in the slurries settling. This leads to inadequate softening of the produced water, which causes scaling issues in once through steam generators.

However, the application of the presently disclosed rheology modifying agents to lime and magnesium oxide slurries has shown significant modification of the rheology of these slurries. The results indicate that the solids remain in suspension longer when the slurries are treated with the presently disclosed polymer-grafted NCC as compared to the current commercial products. The higher suspension of lime and magnesium oxide prevents deposition of solids in transfer pipes, enhances softening and silica removal, increases production by providing higher quality steam, and increases the plant operator's asset life.

In an additional aspect, the present disclosure provides a method for monitoring the rheology of a slurry. In the field, slurry deposits in transfer tubes have been an issue for production and asset life. Slurry may be drawn from a tank and pumped through a transfer pipe. A pressure sensor may be placed at the inlet of the transfer pipe and the sensor can monitor the pressure as the slurry is being pumped therethrough. If the rheology is effectively modified, there will be little or no change in pressure. However, if the solids settle out, they will form deposits in the transfer pipe that will constrict flow through the pipe. The pump will have to apply higher force to maintain the same level of flow. This will raise the pressure on the pipe's inlet and it will indicate that the treatment is not effectively modifying the rheology of the slurry. Therefore, in one aspect, a pressure sensor can be used to determine if the rheology of the slurry has been modified.

In a further aspect, a method of preventing fouling during a hydrocarbon production process is disclosed. The method can include the steps of providing a slurry, such as a magnesium oxide slurry or a lime slurry, and adding a rheology modifying agent, and optionally a chelating agent, to the lime slurry to form a mixture. The method further includes the step of transporting the mixture through a feed line to a warm lime softener. Since the mixture comprises a rheology modifying agent, lime deposits on the feed line will be prevented or highly reduced such that the operation can continue without having to shut down the process to clean fouled feed lines.

In certain hydrocarbon production processes, a pond or similar water storage device is provided to store water (hereinafter "production water") to be used in connection with recovering hydrocarbons. This production water can come from many different sources and generally is not purified. Thus, the production water can contain high amounts of silica. The production water is fed into a warm lime softener to remove contaminants, such as silica. In certain operations, lime slurries and/or magnesium oxide slurries are also fed into the warm lime softener. The lime and/or magnesium oxide slurries assist in silica removal. For example, the silica is able to precipitate onto the magnesium oxide or lime. In certain situations, the pH of the medium inside of the warm lime softener is raised to facilitate silica precipitation. The precipitate is then separated from the water and the water can be fed from the warm lime softener to the next piece of equipment, such as the heat exchanger or the steam generator.

However, as previously mentioned, although lime slurries and magnesium oxide slurries provide the benefit of facilitating silica removal from the production water, the slurries can also form deposits on the feed lines used to feed the slurries into the warm lime softener. In certain aspects, a storage device is provided near the warm lime softener. The storage device can contain the lime slurry. In other aspects, a storage device is provided near the warm lime softener. The storage device can contain the magnesium oxide slurry. In further aspects, two or more storage devices are provided near the warm lime softener. At least one of the storage devices contains the lime slurry and at least one of the storage devices contains a magnesium oxide slurry. Feed lines connect the lime slurry and magnesium oxide slurry storage devices to the warm lime softener. Additionally, the feed lines are used to transport the lime slurry and magnesium oxide slurry from their respective storage devices to the warm lime softener. As discussed above, these feed lines will become fouled with lime and/or magnesium oxide deposits and after about one week to one month, the entire operation will need to be shut down and the feed lines will need to be cleaned either manually or with an acid, for example. However, if any of the presently disclosed rheology modifying agents are added to the lime slurry and/or magnesium oxide slurry, feed line deposits will not occur or they will be greatly reduced.

Not only can the presently disclosed rheology modifying agents modify the rheology of slurries, they can also prevent or reduce scale formation inside of transfer pipes caused by solids settling out of the slurry and solidifying.

Examples

The following examples illustrate methods of making the presently disclosed rheology modifying agents and the unexpected, beneficial technical effects achieved by the agents.

Generally speaking, the polymer-grafted NCC may be prepared according to the following synthetic scheme, although the synthesis is certainly not limited to this route. Moreover, although acrylic acid and acrylamide are shown as reactants, other vinyl monomers and/or polymers may be used, such as, but not limited to, dimethylaminoethyl acrylate methyl chloride quaternary (DMAEA.MCQ) and those shown in Table 1.

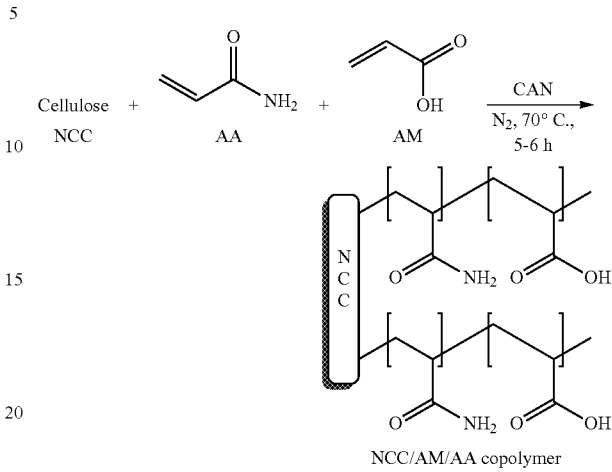

NCC/AM/AA copolymer

A polymer-grafted NCC was prepared by fitting a 4-neck, 1.5 L reactor with:
1) an overhead mechanical stirrer connected to a metal shaft and a conical stirrer;
2) a nitrogen inlet and sparge tube;
3) a claisen adapter fitted with a reflux condenser;
4) a temperature probe (RTD) inserted through a connector; and
5) a temperature controller.

To the reactor was added about 562.5 mL of a pH adjusted NCC dispersion ($1.14 \times 10^{-6}$ mol, 2.81 g, pH=2). The reactor was purged with nitrogen for about 30 minutes and then ceric ammonium nitrate (CAN) ($1.12 \times 10^{-3}$ mol, 6.17 g, 10 mL DI water) was allowed to react with the NCC backbone for about 15 minutes at room temperature. The reactor was then set to 70° C. and during the temperature increase, about 79.7 g of acrylamide (50.2%, $5.63 \times 10^{-1}$ mol), about 17.2 g of acrylic acid ($2.36 \times 10^{-1}$ mol), and about 48.7 g of water were added to the reactor. The reaction mixture was maintained at 70° C. for about 3 hours and 15 minutes. 45 minutes after the reactor reached 70° C., about 160 ppm of sodium hypophosphite was added.

The reaction was monitored by HNMR and reached about 90% conversion in about 3 hours. Post-modification was carried out using potassium persulfate (KPS, 500 μmol) and sodium metabisulfite (SBS, 3,500 μmol) to burn out residual monomers. The nitrogen sparge was maintained throughout the reaction. The final pH of the polymer was adjusted to about 7 with NaOH. In this example, an anionic NCC/acrylamide/acrylic acid polymer was produced having about a 70/30 mole ratio of acrylamide to acrylic acid. Other polymer-grafted NCC agents in accordance with the present disclosure may be prepared according to this synthetic route.

The presently disclosed rheology modifying agents were evaluated using cylinder inversion methods for comparison with commercially available treatments. A new methodology was also developed for monitoring the rheology of solids using a Brookfield HA DVIII.

In a first set of experiments, 4% MgO slurries in 100 mL graduated cylinders were treated with various dosages of treatments (as defined in Table 2) and allowed to settle for 4 hours until a "cake" formed in the bottom of the cylinders from solids settling. At the end of the 4 hours settling, cylinders were inverted as many times as necessary to break up the layer of solids. Cakes that broke apart with the least number of inversions indicated that their rheology was modified more efficiently. The results depicted in FIG. 1 show the performance on an active basis. For example, 25 ppm of active treatment 2 performs as well as 50 ppm of treatment 4.

TABLE 2

| Product Id | Composition | % actives |
|---|---|---|
| Treatment 1 | Sulfomethylated polymer (27 mol %) of AA (44 mol %)/AM (29 mol %)/HAPNQ tagged monomer | 35.0 |
| Treatment 2 | Copolymer of AA (80 mol %)/AMPS (20 mol %)/HAPNQ | 28.0 |
| Treatment 3 | AM/AA copolymer with EDTA | 2.0 |
| Treatment 4 | AM (70 mol %)/AA (30 mol %) grafted nanocrystalline cellulose | 8.016 |
| Treatment 5 | PAA (100 mol %) grafted nanocrystalline cellulose | 8.0 |
| Treatment 6 | DMAEA-MCQ (10 mol %)/DMAEA-BCQ (25 mol %)/AM | 20 |
| Treatment 7 | Nalmet 1689 (Polydithiocarbamate, 50 mol %) | 31 |
| Treatment 8 | Tetrasodium EDTA | 100 |

In Table 2, the abbreviations are defined as follows:
AA: acrylic acid
AMPS: 2-acrylamido-2-methylpropane-1-sulfonic acid
HAPNQ: N, N'-dimethyl-N-[3-[N'-(4-methoxy naphthalimide)]] propyl-N-(2-hydroxy-3-allyloxy) propyl ammonium hydroxide
AM: acrylamide
EDTA: ethylenediaminetetraacetic acid
PAA: polyacrylic acid
DMAEA-MCQ: N,N-dimethylaminoethylacrylate methyl chloride quaternary amine salt
DMAEA-BCQ: N,N-dimethylaminoethylacrylate benzyl chloride quaternary amine salts.

These inversion method results were mainly based on a qualitative analysis. Since this method has operator-dependent variables, another method that provides more quantifiable data was used in order to validate.

The Brookfield HA-DVIII Rheometer was used for analyzing the rest of the rheology modification testing to generate quantitative data. This method provides a consistent measurement for every sample. Samples were prepared by slow addition of lime and magnesium oxide to water as a stirrer continuously mixed the slurry. Once the slurry was homogenized, the treatments were added as the slurry continued to mix.

All of the MgO and lime slurry samples were prepared in 100 mL glass beakers. First, the water was measured by weight, in a 100 mL beaker. A stirrer was used to mix the slurry at a medium speed of 500 rpm. MgO or lime was added in a very slow and steady pace while the stirrer continuously blended the slurry. Once all the powder was transferred to the beaker, the slurry continued to mix for an additional 1-2 minutes to assure the slurry was fully homogenized.

Next, the product treatments were added individually, with approximately 30 second gaps between each addition to allow individual treatments to mix well and react with the slurry. Once all the treatments were added, the slurry mixed for an additional minute to allow all the treatments to fully blend together to form a slurry. The stirrer was then turned off and immediately removed from the beaker to prevent interference with the settling process. Finally, the beaker was covered with parafilm without disturbing the slurry and the slurry was allowed to settle.

MgO slurries (25 wt. %) were allowed to settle for about 5 hours, whereas lime slurries (10 wt. %) were allowed to settle for about 7 hours. Yield stress measurements were performed using a Brookfield HA-DV III Rheometer. The Brookfield Rheometer provides data on the extent of modification in rheology, by measuring the yield stress of slurry solids that have settled and formed a "cake". The yield stress of the solids is calculated in Pascals (Pa) by incorporating the maximum torque value TR(max) provided by the Brookfield Rheometer into the yield stress equation "T"= (TK*YMC*T)/10, where T =Yield Stress
TK=Brookfield Model Torque Constant
YMC=Yield Multiplier Constant
T=TR(max)

Figure 2:
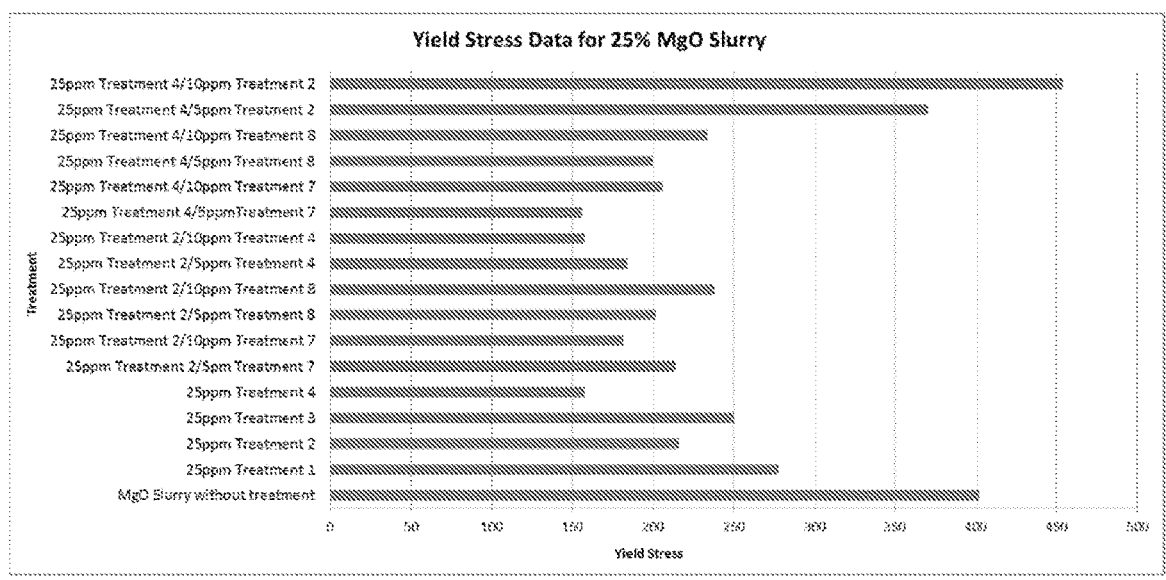
FIG. 2 depicts data obtained from a yield stress test.

The YMC is based on the type of spindle that is used for measuring the percent torque. Spindles are required to be immersed at the proper depth that aligns the top surface of the cake layer with either the primary or the secondary markers. If the sample only reaches the secondary markers (located on the vane of spindle), the YMC must be doubled. As the spindle starts to slowly turn, the percent torque rises until the spindle breaks the solids and continues to spin. If the solids settle fast and formed a compact layer, the percent torque will be high as well as shear stress. However, if a modifier allowed the solid particles to remain in suspension longer, the percent torque and yield stress of the layer of solids will be low. A minimum of 25% MgO Slurry is required to allow proper spindle readings. In the Yield Stress test results (see FIG. 2), a lower yield stress indicates a more effective treatment.

The same rheology modification method was used for both MgO and lime slurry rheology. Since lime has different physical properties, only 10% solids were required for allowing the Brookfield instrument to take accurate measurements. Also, a longer settling period was required for lime solids to form a layer that was compact enough for proper measurements.

Figure 3:
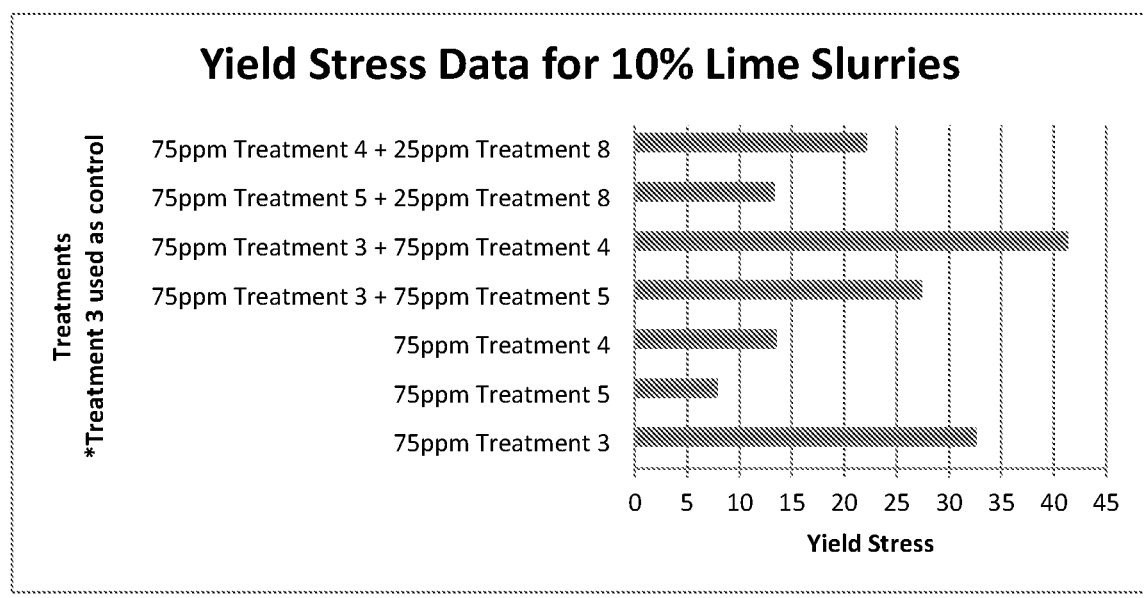
FIG. 3 depicts data obtained from a yield stress test.

FIG. 3 suggests that treatment 5 is the best performing candidate.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a rheology modifying agent" is intended to include "at least one rheology modifying agent" or "one or more rheology modifying agents."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of modifying the rheology of a slurry comprising:
adding a rheology modifying agent to a slurry, wherein the rheology modifying agent comprises polymer-grafted nanocrystalline cellulose (NCC),
wherein the slurry is a lime slurry or a magnesium oxide slurry,
wherein the polymer-grafted nanocrystalline cellulose comprises a grafted polymer chain with a molecular weight of at least 200,000 Da.

2. The method of claim 1, wherein the rheology modifying agent comprises from about 0.1 ppm to about 1,000 ppm of the polymer-grafted NCC.

3. The method of claim 1, wherein the polymer-grafted NCC comprises acrylamide, acrylic acid, or a combination thereof.

4. The method of claim 1, wherein the polymer-grafted NCC comprises an anionic monomer, a nonionic monomer, a cationic monomer, or any combination thereof.

5. The method of claim 1, wherein the polymer-grafted NCC comprises one or more monomers selected from the group consisting of vinyl acetate, acrylic acid, sodium acrylate, ammonium acrylate, methyl acrylate, acrylamide, acrylonitrile, N,N-dimethyl acrylamide, 2-acrylamido-2-methylpropane-1-sulfonic acid, sodium 2-acrylamido-2-methylpropane-1-sulfonate, 3-acrylamidopropyl-trimethyl-ammonium chloride, diallyldimethylammonium chloride, 2-(dimethylamino)ethyl acrylate, 2-(acryloyloxy)-N,N,N-trimethylethanaminium chloride, N,N-dimethylaminoethyl acrylate benzyl chloride quaternary salt, 2-(dimethylamino) ethyl methacrylate, 2-(methacryloyloxy)-N,N,N-trimethyl ethanaminium chloride, 3-(dimethylamino)propyl methacrylamide, methacrylic acid, methacrylic anhydride, methyl methacrylate, methacryloyloxy ethyl trimethyl ammonium chloride, 3-methacrylamidopropyl-trimethyl-ammonium chloride, hexadecyl methacrylate, octadecyl methacrylate, docosyl acrylate, N-vinyl pyrrolidone, 2-vinyl pyridine, 4-vinyl pyridine, epichlorohydrin, N-vinyl formamide, N-vinyl acetamide, 2-hydroxyethyl acrylate, glycidyl methacrylate, 3-(allyloxy)-2-hydroxypropane-1-sulfonate, and 2-(allyloxy)ethanol.

6. The method of claim 1, wherein the rheology modifying agent comprises a chelating agent selected from the group consisting of ethylenediaminetetraacetic acid (EDTA), citric acid, ligno sulfonates, dimercaprol (2,3-dimercapto-1-propanol), prophine, and any combination thereof.

7. The method of claim 1, wherein the rheology modifying agent comprises from about 25 ppm to about 100 ppm of acrylamide and acrylic acid-grafted NCC.

8. The method of claim 7, wherein the rheology modifying agent comprises from about 1 ppm to about 100 ppm of EDTA.

9. The method of claim 1, wherein the rheology modifying agent comprises about 25 ppm of polyacrylic acid-grafted NCC.

10. The method of claim 9, wherein the rheology modifying agent comprises from about 1 ppm to about 100 ppm of EDTA.

11. The method of claim 1, wherein the slurry is a magnesium oxide slurry.

* * * * *